United States Patent [19]

Simon

[11] Patent Number: 4,464,972
[45] Date of Patent: Aug. 14, 1984

[54] LATERAL SUPPORT SYSTEM FOR CANISTER-LAUNCHED MISSILE

[75] Inventor: Wayne E. Simon, Evergreen, Colo.

[73] Assignee: The United States of America as represented by the Secretary of the Air Force, Washington, D.C.

[21] Appl. No.: 475,665

[22] Filed: Mar. 15, 1983

[51] Int. Cl.³ ............................ F41F 3/04; F16J 15/10
[52] U.S. Cl. .................................... 89/1.816; 277/216
[58] Field of Search ................ 89/1.816, 1.817, 1.819, 89/1.8, 1.809, 1.810; 277/199, 192, 216

[56] References Cited

U.S. PATENT DOCUMENTS

| | | | |
|---|---|---|---|
| 2,377,839 | 6/1945 | Dake | 102/514 X |
| 3,089,388 | 5/1963 | Webster et al. | 89/1.816 |
| 3,124,040 | 3/1964 | Fiedler | 89/1.816 |
| 3,130,560 | 4/1964 | Pilcher | 89/1.8 X |
| 3,166,978 | 1/1965 | Price et al. | 89/1.816 |
| 3,253,511 | 5/1966 | Zwicky | 89/1.814 |
| 3,266,373 | 8/1966 | Brown | 89/1.816 X |
| 3,367,235 | 2/1968 | Andrews | 89/1.816 |
| 3,502,069 | 3/1970 | Silverman | 128/774 |
| 3,857,321 | 12/1974 | Cohen | 89/1.810 |
| 4,324,167 | 4/1982 | Piesik | 89/1.8 |
| 4,399,999 | 8/1983 | Wold | 89/1.816 |
| 4,433,848 | 2/1984 | Williams | 89/1.816 |

Primary Examiner—David H. Brown
Attorney, Agent, or Firm—Donald J. Singer; Bobby D. Scearce

[57] ABSTRACT

A novel lateral support system for a canister launched missile is provided which comprises, a plurality of long, narrow flexible pads of elastomer or like material disposed on the surface of said missile along a substantial lengthwise portion thereof and configured to substantially fill the annular gap between the missile and canister, each of said pads being hingedly attached near the canister exit opening whereby the pads are peeled from the surface of the missile during launch thereof.

4 Claims, 4 Drawing Figures

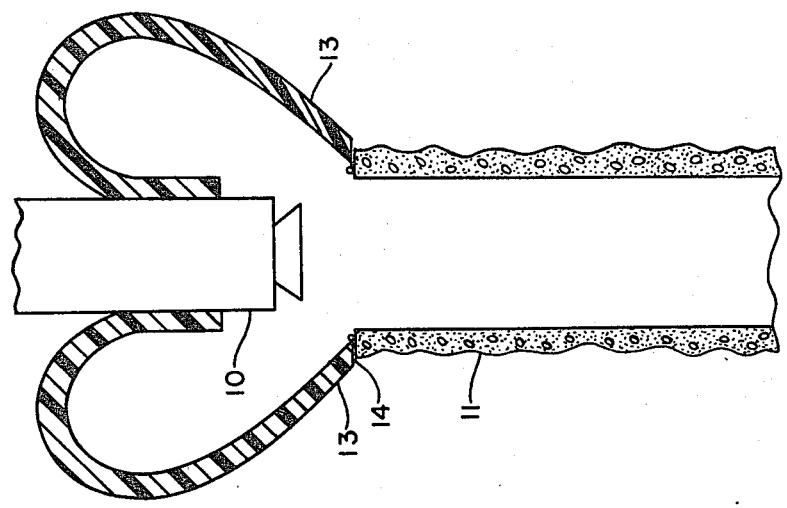
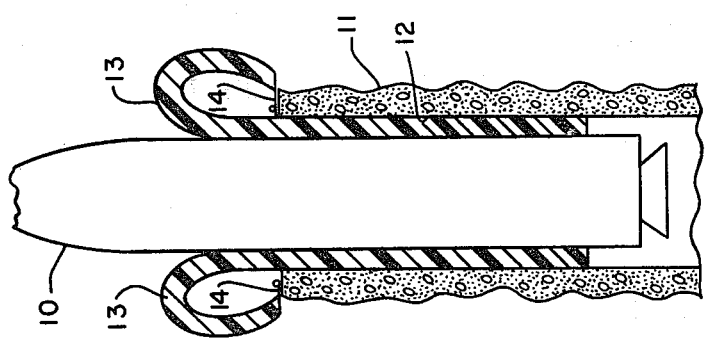
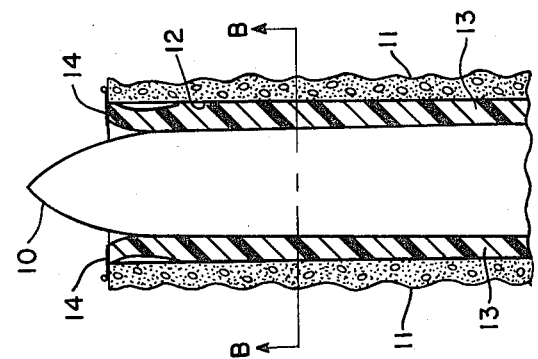
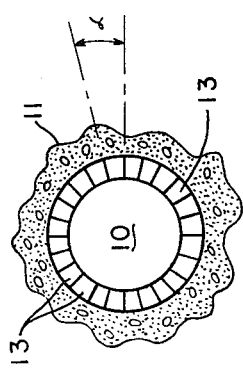

LATERAL SUPPORT SYSTEM FOR CANISTER-LAUNCHED MISSILE

RIGHTS OF THE GOVERNMENT

The invention described herein may be manufactured and used by or for the Government of the United States for all governmental purposes without the payment of any royalty.

BACKGROUND OF THE INVENTION

The present invention relates generally to the field of seals configured to pressure seal large annular gaps, and more particularly to elastomeric seals configured to provide lateral support of a missile within its canister and to seal the annular gap between the missile and its launch canister.

Annular seals configured to fill the annular gap between the outer surface of a missile and the inner surface of its launch canister perform two critical functions during the storage and launch of a missile, viz., to provide a suitable sliding gas seal within the annular gap against excessive launch pressure leakage, and to provide sufficient lateral support of the missile within its canister. These seals are generally of two types: canister mounted seals are configured to be mounted to the inner surface of the canister and remain inside the canister upon launch of the missile; missile mounted seals are characteristically mounted to the outer surface of the missile (or to a deployable mounting means attached thereto) and are expelled from the canister along with the missile. Upon launch of the missile, missile mounted seals are normally ejected from the missile surface by spring means or explosive charges. Both the canister mounted seal and the missile mounted seal may typically comprise solid elastomers because the relatively high strength and temperature resistance which characterize certain of these elastomers make them particularly suitable.

Existing configurations of the missile mounted type often include a great number of individual elastomeric support pads attached to the outer surface of the missile. Depending on the location of placement on the missile surface, either spring or explosive release means are utilized to jettison the support pads upon launch of the missile. These configurations suffer the disadvantage of requiring the means, either on the missile or incorporated into the pad structure, to separate the pads from the missile upon launch. Further, under certain launch conditions, the jettisoned pads could fall onto and damage ground facilities or impact the missile sufficient to damage the missile or otherwise interfere with its operation.

The present invention provides a novel support system for a canister-launched missile which eliminates or substantially reduces in critical importance the aforesaid disadvantages characterizing existing missile mounted pad configurations. The invention comprises a plurality of long, narrow elastomeric pads disposed along a substantial portion of the length of the missile within the annular gap between missile and canister, each pad hingedly attached at its upper end to the canister and configured to slide out of the canister with the missile upon launch and be pulled away from the missile by reason of the hinged connection as the missile exits the canister. As a consequence, the elastomeric pads provide sufficient gas seal to minimize loss of launch pressure, safe jettisoning of the pads upon launch is ensured, and the energy delivered to the pads is minimized.

It is, therefore, an object of this invention to provide an improved support for a missile within its launch canister.

It is a further object of this invention to provide an improved means for sealing the annular gap between a missile and its launch canister to minimize loss of launch pressure.

It is yet a further object of this invention to provide a support system for a canister-launched missile which is jettisoned upon launch with minimal expenditure of energy.

These and other objects of the present invention will become apparent as the detailed description of specific representative embodiments thereof proceeds.

SUMMARY OF THE INVENTION

In accordance wih the foregoing principles and objects of the present invention, a novel lateral support system for a canister launched missile is provided which comprises, a plurality of long, narrow flexible pads of elastomer or like material disposed on the surface of said missile along a substantial lengthwise portion thereof and configured to substantially fill the annular gap between the missile and canister, each of said pads being hingedly attached near the canister exit opening whereby the pads are peeled from the surface of the missile during launch thereof.

DESCRIPTION OF THE DRAWINGS

The present invention will be more clearly understood from the following detailed description of certain representative embodiments thereof read in conjunction with the accompanying drawings wherein:

FIG. 1a is a schematic partial axial sectional view of a missile supported within its canister using the support system of the present invention.

FIGS. 1b and 1c depict two seriatim positions of the missile during launch.

FIG. 2 is a sectional view taken along line B—B of FIG. 1a.

DETAILED DESCRIPTION

Referring now to FIG. 1a, shown therein is schematic sectional representation of a missile 10 reposed in a launch-ready position within its launch tube or canister 11. An annular space 12 is defined between the outer surface of missile 10 and the inner surface of canister 11. In conventional missile 10-canister 11 configurations, the radial thickness of annular space 12 may characteristically range from about 5 cm to about 10 cm and must be sufficiently sealed to ensure against undesirable loss of launch pressure therethrough upon ignition of the engines of missile 10.

According to the present invention, a suitable seal and lateral support system for missile 10 within canister 11 may be provided by a plurality of long, narrow flexible pads 13 comprising an elastomer or like material disposed lengthwise along a substantial portion of the missile 10 surface, each pad 13 having sufficient thickness to substantially fill annular gap 12. As shown in FIG. 2, the annular gap 12 may be filled using a plurality of adjacent pads 13 disposed around the periphery of the outer surface of missile 10. As hereinafter discussed, it is desirable that each pad 13 be of sufficient size to fill an angular segment $\alpha$ of gap 12 of about 15° to about 20°, thus the pads 13 may desirably number from about 18 to 24 depending on the selected configuration. It is understood, however, that the stated number need not be limiting of the invention herein, and may be greater or less than the stated range depending on the mechanical properties (compressive strength, flexibility, etc.) of the elastomeric material selected for use, and on the diametric sizes of missile 10, canister 11 and annular gap 12.

The elastomer selected for use as pad 13 within the contemplation of the invention herein will possess sufficient compressive strength to provide lateral support to the missile 10 within canister 11 and will display suitable flexibility along its length to bend away from missile 10 upon launch as described below in relation to FIGS. 1b and 1c. Such elastomers suitable for use may include natural rubber, nitrile, butyl, ethylene propylene rubber (EPR), neoprene (DuPont TM), or blends of the above.

In order to accomplish certain of the objectives of the present invention, it is desirable that the elastomeric pads 13 be connected to canister 11 in such a manner that they separate from missile 10 upon launch. In one representative embodiment of this invention, as presented in the accompanying drawings, this is accomplished by hingedly connecting each pad 13 to canister 11 as shown. One of a plurality of hinged plates 14 is connected to each of the pads 13 near the upper end thereof, and each such plate 14 is hingedly attached to canister 11 substantially as shown in FIGS. 1a, 1b and 1c.

Referring now specifically to FIGS. 1b and 1c, shown therein are two seriatim positions of missile 10 relative to canister 11 during launch. By reason of pads 13 being longitudinally flexible and hingedly attached as described above, as missile 10 rises from within canister 11, pads 13, being somewhat adherent to missile 10 and slideably constrained relative to the inner surface of canister 11, are pulled out of canister 11 with missile 10. As the missile 10 rises within canister 11, pads 13 flex and pull from the surface of missile 10 in a manner substantially as shown in FIG. 1b. As missile 10 exits canister 11 as shown in FIG. 1c, each pad 13 continues to flex outwardly from missile 10 by reason of being constrained by a hinge plate 14 until removal is complete at an instant just subsequent to that represented by FIG. 1c.

In order for elastomeric pads 13 to exit canister 11 with missile 10, each pad 13 may be made to be adherent to the outer surface of missile 10, and at the same time slip relatively freely on the inner surface of canister 11. This may be accomplished by providing each pad 13 with a surface which exhibits a large coefficient of friction interfacing the outer surface of missile 10.

The present invention, as hereinabove described, therefore provides an improved elastomeric pad support system and launch pressure seal for a canister launched missile. It is understood that certain modifications to the invention and material substitutions thereto as hereinabove described may be made, as might occur to one with skill in the field of this invention, within the scope of the appended claims. Therefore, all embodiments contemplated hereunder have not been shown in complete detail. Other embodiments may be developed without departing from the spirit of this invention or from the scope of the appended claims.

I claim:

1. A system for supporting a missile within its launch canister and for sealing the annular gap between said missile and canister, which comprises:
   a. a plurality of elongate flexible pads disposed lengthwise on the outer surface of said missile; and
   b. means hingedly attaching one end of each said flexible pads to said canister near the exit opening thereof.

2. The support system as recited in claim 1 wherein each of said pads fills an angular segment of said gap of from about 15° to about 20° around the circumference of said missle.

3. The support system as recited in claim 1 wherein each said pad comprises an elastomer.

4. The support system as recited in claim 3 wherein said elastomer is selected from a group consisting of natural rubber, nitrile, butyl, ethylene propylene rubber, and neoprene.

* * * * *